United States Patent
Marzke

(10) Patent No.: US 8,949,746 B2
(45) Date of Patent: Feb. 3, 2015

(54) PROVIDING ACCESS FOR BLIND USERS ON KIOSKS

(75) Inventor: Rex E. Marzke, Houston, TX (US)

(73) Assignee: International Business Machines Corporation, Armonk, NY (US)

(*) Notice: Subject to any disclaimer, the term of this patent is extended or adjusted under 35 U.S.C. 154(b) by 1075 days.

(21) Appl. No.: 12/617,161

(22) Filed: Nov. 12, 2009

(65) Prior Publication Data

US 2011/0113328 A1    May 12, 2011

(51) Int. Cl.
| | | |
|---|---|---|
| G07F 19/00 | (2006.01) | |
| G06F 3/048 | (2013.01) | |
| G06Q 40/00 | (2012.01) | |
| G06F 3/00 | (2006.01) | |
| G06F 3/16 | (2006.01) | |
| G06F 3/0488 | (2013.01) | |
| G09B 21/00 | (2006.01) | |

(52) U.S. Cl.
CPC ............ G06F 3/167 (2013.01); G06F 3/04886 (2013.01); *G07F 19/20* (2013.01); *G09B 21/006* (2013.01); G06F 3/0488 (2013.01)
USPC ........... 715/865; 715/861; 715/862; 715/863; 715/864; 345/173; 235/379

(58) Field of Classification Search
CPC ... G06F 3/04886; G06F 3/0488; G07F 19/20; G09B 21/006
USPC .......... 715/861, 862, 863, 864, 865; 235/379; 345/173
See application file for complete search history.

(56) References Cited

U.S. PATENT DOCUMENTS

| | | | |
|---|---|---|---|
| 5,412,189 A | 5/1995 | Cragun | |
| 6,049,328 A | 4/2000 | Vanderheiden | |
| 6,061,666 A | 5/2000 | Do et al. | |
| 6,326,934 B1 * | 12/2001 | Kinzie | 345/1.1 |
| 6,384,743 B1 | 5/2002 | Vanderheiden | |
| 6,464,135 B1 * | 10/2002 | Cohen et al. | 235/379 |
| 6,489,951 B1 * | 12/2002 | Wong et al. | 345/173 |
| 6,527,171 B1 | 3/2003 | Brooks et al. | |
| 6,999,066 B2 | 2/2006 | Litwiller | |
| 7,175,076 B1 * | 2/2007 | Block et al. | 235/379 |
| 7,187,394 B2 | 3/2007 | Chandane | |
| 7,413,115 B1 * | 8/2008 | Schuster et al. | 235/379 |
| 7,494,053 B1 * | 2/2009 | Burns | 235/379 |

(Continued)

OTHER PUBLICATIONS

Hersh, et al., Disability and Assistive Technology Systems, May 12, 2010, Assistive Technology for Visually Impaired and Blind People.*
EZ Access FAQs, Jul. 14, 2009, pp. 1-9 retrieved Aug. 24, 2009 http://trace.wisc.edu/faqs/ezfaq/index.html.

(Continued)

*Primary Examiner* — Jordany Nunez
(74) *Attorney, Agent, or Firm* — Yee & Associates, P.C.; John R. Pivnichny

(57) ABSTRACT

A computer implemented method provides access to accommodate public use software environments. An attractor screen is displayed on a data processing system providing the public use environment. An interaction with the attractor screen is then detected. If the interaction with the attractor screen complies with audio instructions for executing a software overlay, the control software for the public use system is launched along with the software overlay. If the interaction with the attractor screen does not comply with audio instructions for executing a software overlay, the control software for the public use system is launched without the software overlay.

23 Claims, 5 Drawing Sheets

(56) References Cited

U.S. PATENT DOCUMENTS

| | | |
|---|---|---|
| 7,552,868 B1 * | 6/2009 | Block et al. .................... 235/379 |
| 2004/0138924 A1 * | 7/2004 | Pristine ............................ 705/2 |
| 2008/0066007 A1 * | 3/2008 | Lau et al. ....................... 715/783 |
| 2009/0100380 A1 * | 4/2009 | Gardner et al. ............... 715/854 |

OTHER PUBLICATIONS

PayCashMobile, pp. 1-9 retrieved Aug. 26, 2009 http://paycashmobile.com/.

* cited by examiner

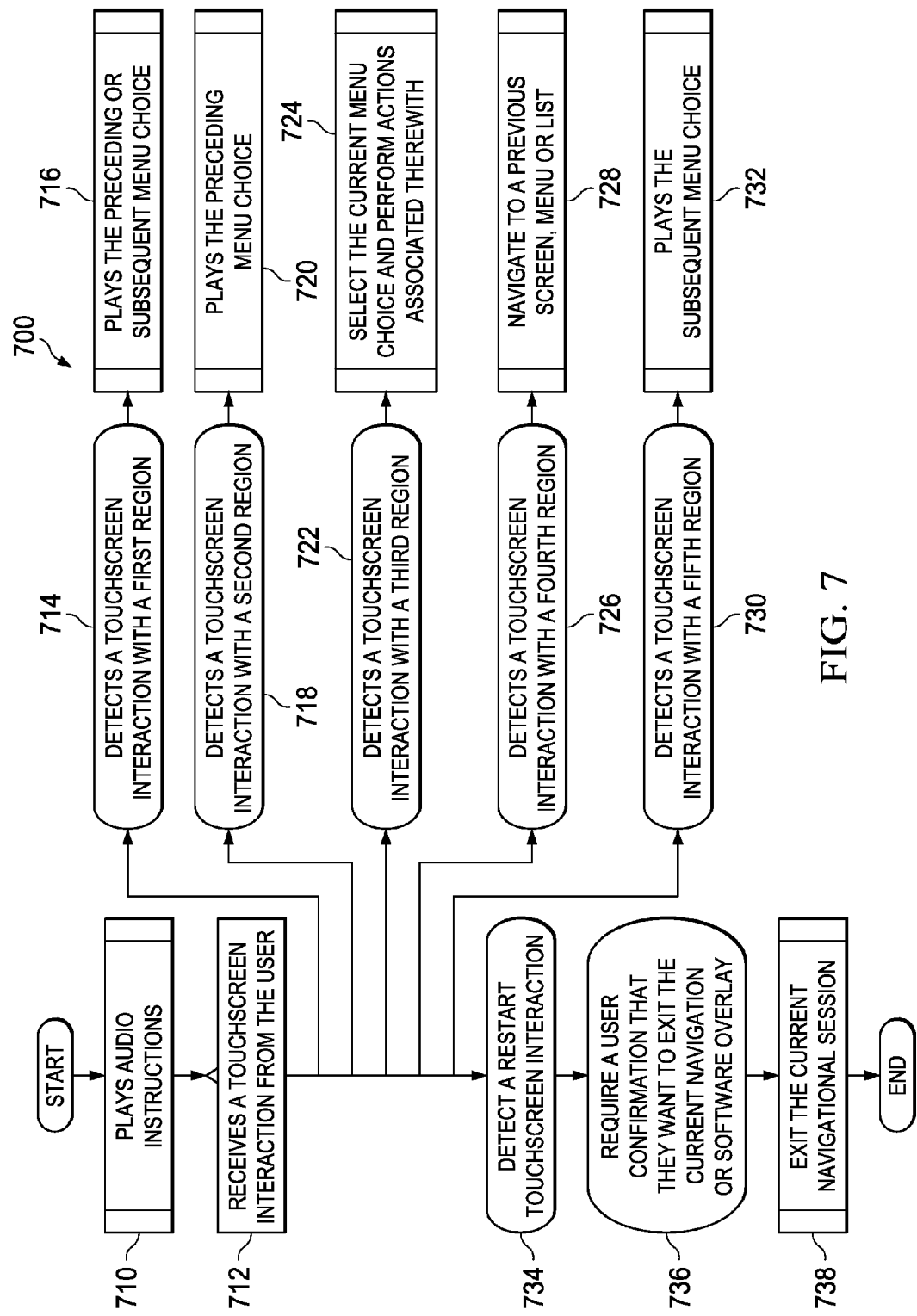

US 8,949,746 B2

PROVIDING ACCESS FOR BLIND USERS ON KIOSKS

BACKGROUND

1. Field

The disclosure relates generally to data processing systems, computer implemented methods, and computer usable program code. More specifically, the disclosure relates to a data processing system, computer implemented method, and computer usable program code for accommodating access to public use software environments.

2. Description of the Related Art

As the computer industry moves towards user interfaces that are more and more graphically oriented, most users are noticing an improved ease of use. But visually impaired people find graphically oriented computers, automatic teller machines, public information kiosks, and the like, extremely difficult for them to use, if not outright impossible. This schism between sighted and visually impaired users is even wider with the ever increasing use of touch screen technology, since keyboards or other input devices are no longer required, and the only feedback given to a user is often exclusively visual. A visually impaired user cannot use a conventional touchscreen display, since he or she has no idea where to touch the display to instruct the computer to do what he or she wants it to do, and cannot receive any sufficient feedback indicating what is happening. The use of touchscreen displays in common devices, such as automatic teller machines, prevents visually impaired people from easily performing routine daily functions.

SUMMARY

According to one embodiment, a computer implemented method for accommodating access to public use software environments is provided. An attractor screen is displayed on a data processing system providing the public use environment. An interaction with the attractor screen is then detected. If the interaction with the attractor screen complies with audio instructions for executing a software overlay, the control software for the public use system is launched along with the software overlay. If the interaction with the attractor screen does not comply with audio instructions for executing a software overlay, the control software for the public use system is launched without the software overlay.

BRIEF DESCRIPTION OF THE SEVERAL VIEWS OF THE DRAWINGS

FIG. 7 is a flowchart of a software process for providing accommodations to access public use software environments according to an illustrative embodiment.

DETAILED DESCRIPTION

Figure 1:
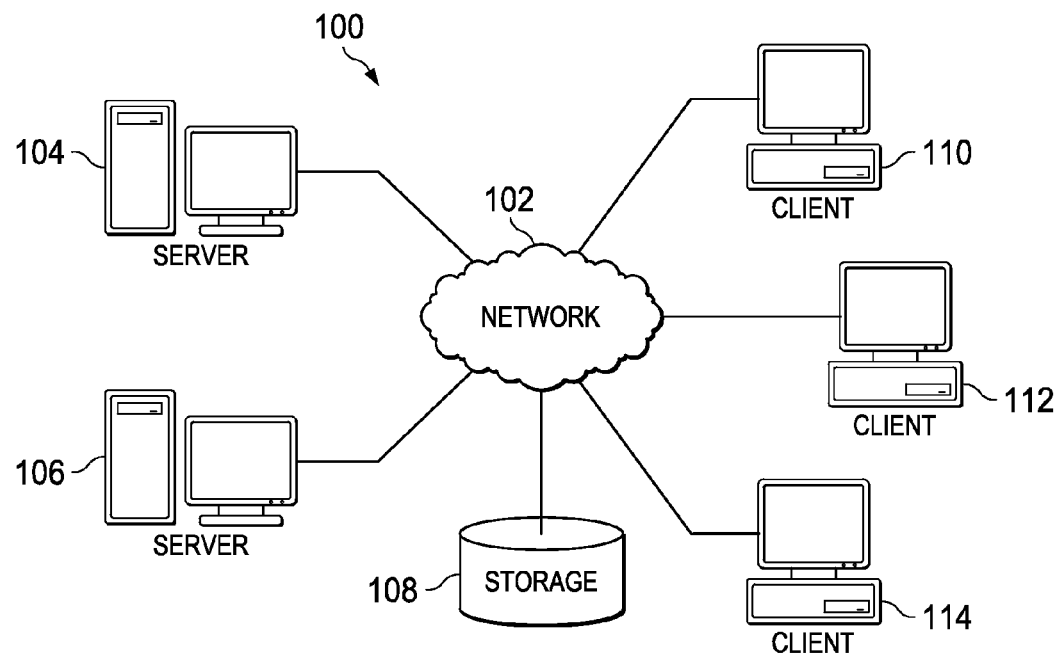
FIG. 1 is a pictorial representation of a network of data processing systems in which illustrative embodiments may be implemented.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.), or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by, or in connection with, an instruction execution system, apparatus, or device.

A computer readable signal medium may include a propagated data signal with computer readable program code embodied therein, for example, in baseband, or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by, or in connection with, an instruction execution system, apparatus, or device.

Program code embodied on a computer readable medium may be transmitted using any appropriate medium, including, but not limited to, wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like, and conventional procedural programming languages, such as the "C" programming language or similar programming languages. The program code may execute entirely on the user's computer, partly on the user's computer, as a stand-alone software package, partly on the user's computer, and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 2:
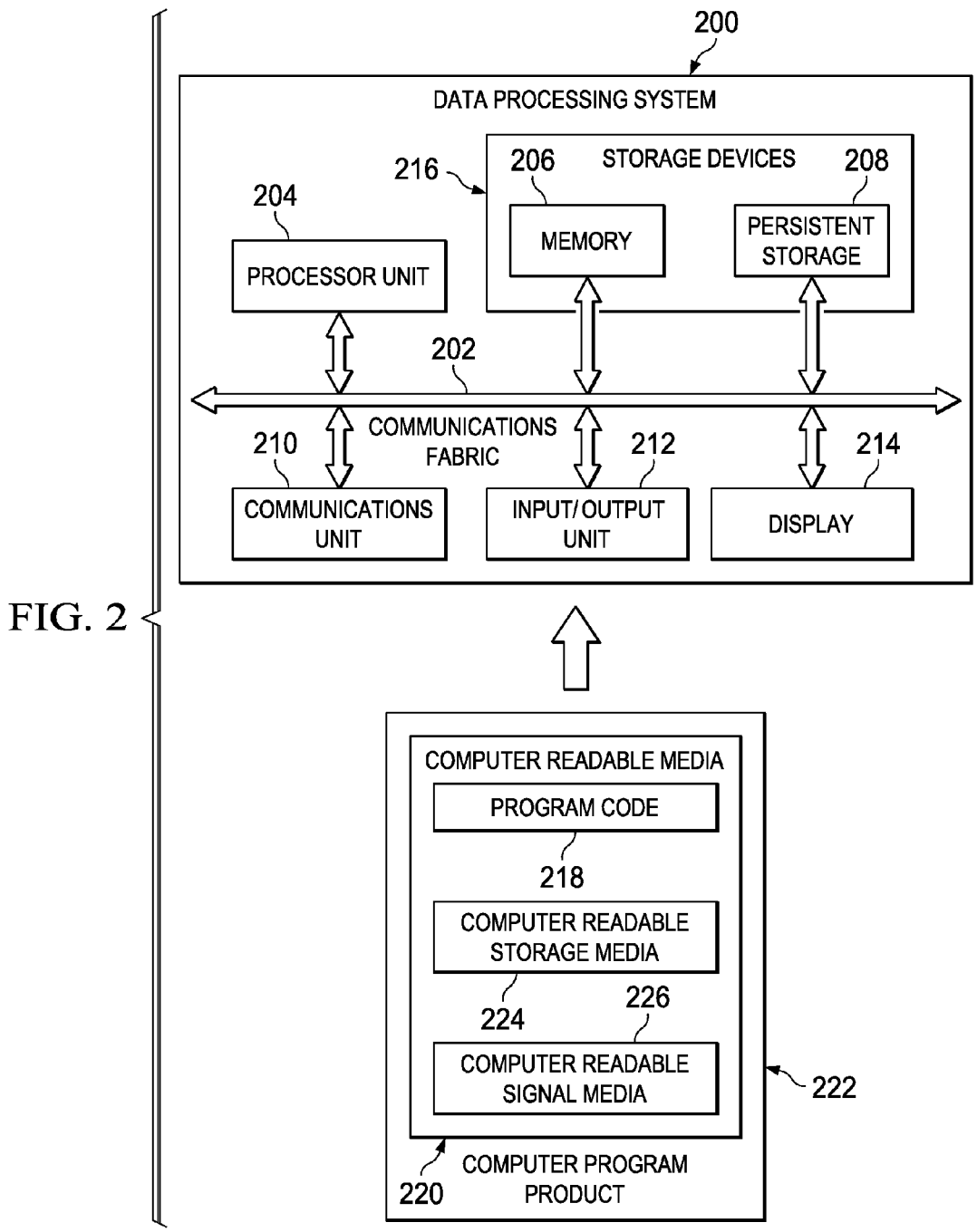
FIG. 2 is a diagram of a data processing system depicted in accordance with an illustrative embodiment.

With reference now to the figures, and in particular, with reference to FIGS. 1-2, exemplary diagrams of data processing environments are provided in which illustrative embodiments may be implemented. It should be appreciated that FIGS. 1-2 are only exemplary and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers in which the illustrative embodiments may be implemented. Network data processing system 100 contains network 102, which is the medium used to provide communication links between various devices and computers connected together within network data processing system 100. Network 102 may include connections, such as wire, wireless communication links, or fiber optic cables.

In the depicted example, server 104 and server 106 connect to network 102 along with storage unit 108. In addition, clients 110, 112, and 114 connect to network 102. Clients 110, 112, and 114 may be, for example, personal computers or network computers. In the depicted example, server 104 provides information, such as boot files, operating system images, and applications to clients 110, 112, and 114. Clients 110, 112, and 114 are clients to server 104 in this example. Network data processing system 100 may include additional servers, clients, and other devices not shown.

Program code located in network data processing system 100 may be stored on a computer recordable storage medium and downloaded to a data processing system or other device for use. For example, program code may be stored on a computer recordable storage medium on server 104 and downloaded to client 110 over network 102 for use on client 110.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the different illustrative embodiments.

With reference now to FIG. 2, a diagram of a data processing system is depicted in accordance with an illustrative embodiment. Data processing system 200 is an example of a computer, such as server 104 or client 110 in FIG. 1, in which computer usable program code or instructions implementing the processes may be located for the illustrative embodiments. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems, in which a main processor is present with secondary processors on a single chip. As another illustrative example, processor unit 204 may be a symmetric multi-processor system containing multiple processors of the same type.

Memory 206 and persistent storage 208 are examples of storage devices 216. A storage device is any piece of hardware that is capable of storing information, such as, for example, without limitation, data, program code in functional form, and/or other suitable information either on a temporary basis and/or a permanent basis. Memory 206, in these examples, may be, for example, a random access memory, or any other suitable volatile or non-volatile storage device. Persistent storage 208 may take various forms, depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 may be removable. For example, a removable hard drive may be used for persistent storage 208.

Communications unit 210, in these examples, provides for communication with other data processing systems or devices. In these examples, communications unit 210 is a network interface card. Communications unit 210 may provide communications through the use of either or both physical and wireless communications links.

Input/output unit 212 allows for the input and output of data with other devices that may be connected to data processing system 200. For example, input/output unit 212 may provide a connection for user input through a keyboard, a mouse, and/or some other suitable input device. Further, input/output unit 212 may send output to a printer. Display 214 provides a mechanism to display information to a user.

Instructions for the operating system, applications, and/or programs may be located in storage devices 216, which are in communication with processor unit 204 through communications fabric 202. In these illustrative examples, the instructions are in a functional form on persistent storage 208. These instructions may be loaded into memory 206 for execution by processor unit 204. The processes of the different embodiments may be performed by processor unit 204 using computer implemented instructions, which may be located in a memory, such as memory 206.

These instructions are referred to as program code, computer usable program code, or computer readable program code that may be read and executed by a processor in processor unit 204. The program code, in the different embodiments, may be embodied on different physical or computer readable storage media, such as memory 206 or persistent storage 208.

Program code 218 is located in a functional form on computer readable media 220 that is selectively removable and may be loaded onto or transferred to data processing system 200 for execution by processor unit 204. Program code 218 and computer readable media 220 form computer program product 222. In one example, computer readable media 220 may be computer readable storage media 224 or computer readable signal media 226. Computer readable storage media 224 may include, for example, an optical or magnetic disc that is inserted or placed into a drive or other device that is part of persistent storage 208 for transfer onto a storage device, such as a hard drive, that is part of persistent storage 208. Computer readable storage media 224 also may take the form of a persistent storage, such as a hard drive, a thumb drive, or a flash memory that is connected to data processing system 200. In some instances, computer readable storage media 224 may not be removable from data processing system 200.

Alternatively, program code 218 may be transferred to data processing system 200 using computer readable signal media 226. Computer readable signal media 226 may be, for example, a propagated data signal containing program code 218. For example, computer readable signal media 226 may be an electro-magnetic signal, an optical signal, and/or any other suitable type of signal. These signals may be transmitted over communication links, such as wireless communication links, an optical fiber cable, a coaxial cable, a wire, and/or any other suitable type of communications link. In other words, the communications link and/or the connection may be physical or wireless in the illustrative examples. The computer readable media also may take the form of non-tangible media, such as communication links or wireless transmissions containing the program code.

In some illustrative embodiments, program code 218 may be downloaded over a network to persistent storage 208 from another device or data processing system through computer readable signal media 226 for use within data processing system 200. For instance, program code stored in a computer readable storage media in a server data processing system may be downloaded over a network from the server to data processing system 200. The data processing system providing program code 218 may be a server computer, a client computer, or some other device capable of storing and transmitting program code 218.

The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown. The different embodiments may be implemented using any hardware device or system capable of executing program code. As one example, data processing system 200 may include organic components integrated with inorganic components and/or may be comprised entirely of organic components excluding a human being. For example, a storage device may be comprised of an organic semiconductor.

As another example, a storage device in data processing system 200 is any hardware apparatus that may store data. Memory 206, persistent storage 208, and computer readable media 220 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

The illustrative embodiments provide a computer implemented method for accommodating access to public use software environments. An attractor screen is displayed on the public use environment. An interaction with the attractor screen is then detected. If the interaction with the attractor screen complies with audio instructions for executing a software overlay, the control software for the public use system is launched along with the software overlay. If the interaction with the attractor screen does not comply with audio instructions for executing a software overlay, the control software for the public use system is launched without the software overlay.

Figure 3:
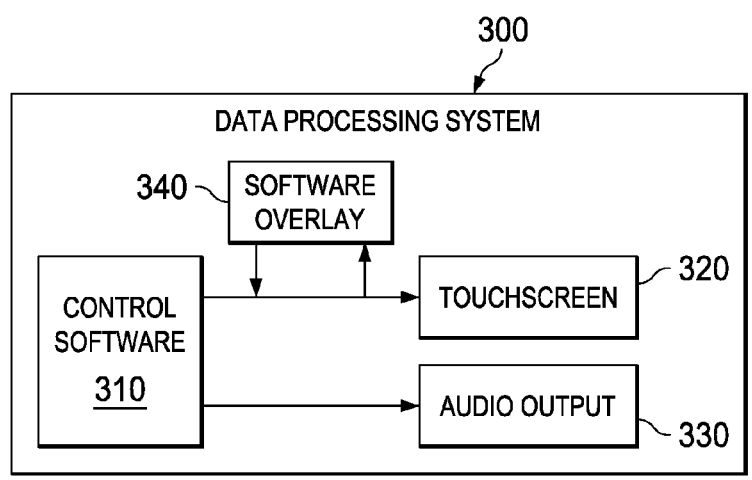
FIG. 3 is a data processing system for accommodating access to public use software environments according to an illustrative embodiment.

Referring now to FIG. 3, a data processing system for accommodating access to public use software environments is shown according to an illustrative embodiment. Data processing system 300 can be a data processing system, such as data processing system 200 of FIG. 2. In an illustrative embodiment, data processing system 300 can be implemented as a kiosk, or other publicly usable data processing terminal.

In an illustrative embodiment, data processing system 300 is an interactive kiosk that provides information access via electronic methods. Interactive kiosks are typically placed in high foot traffic settings to provide information or services to people passing in proximity to the kiosk.

The kiosk can be implemented to perform any number of activities. Intended for both consumers and business industries, the kiosk can be configured to perform, for example, but not limited to, financial services which include bill payment, check cashing and credit applications. The kiosk can be configured to perform, for example, but not limited to, provide retail product information such as in-store product lookup and information. The kiosk can be configured to perform, for example, but not limited to, customer check-in or ticketing services, such as airlines and hotels. The kiosk can be configured to perform, for example, but not limited to, Internet access services. The kiosk can be configured to perform, for example, but not limited to, visitor management and security services. The kiosk can be configured to perform, for example, but not limited to, human resources for benefits information services. The kiosk can be configured to perform, for example, but not limited to, retail check-out point of sale services in brick and mortar stores.

Control software 310 is a software component executing on data processing system 300. Control software 310 provides functionality to data processing system. Control software 310 is the system and user interface software that allows a user to access or utilize the information or services provided by data processing system 300.

Touchscreen 320 is an electronic display that can detect the presence and location of a touch within the display area. While touchscreen 320 typically will detect interaction by a finger or hand, touchscreen 320 can also be configured to sense other objects, such as, but not limited to, a stylus. Touchscreen 320 enables a user to directly interact with images displayed on touchscreen 320, and therefore also the underlying control software 310, rather than indirectly with a mouse or touchpad.

Audio output 330 provides acoustic instructions for data processing system 300. Audio output 330 can explain the user interface of software overlay 340, as well as menu and navigational instructions. A user can access audio output 330 through sound devices, such as a handset, an integrated speaker, or a headset connection provided by an audio connector, such as a tip-ring-sleeve connection input.

Software overlay 340 is software script that interacts with control software 310. While software overlay 340 allows for control of control software 310, software overlay 340 is distinct from the core code of control software 310. For example, Software overlay 340 can be interpreted from source code, whereas control software 310 is traditionally compiled to native machine code. In an illustrative embodiment, software overlay 340 is a JavaScript® script that enables software overlay 340 to program access objects within application software 310.

Software overlay 340 also provides an intuitive graphical user interface, separate from the interface provided by control software 310. The intuitive graphical user interface of software overlay 340 rearranges elements of the interface provided by control software 310, rendering the underlying control software 310 more intuitive and user friendly to persons having a visual impairment. Additionally, software overlay 340 provides audio instructions detailing menu options and current navigational status.

Figure 4:
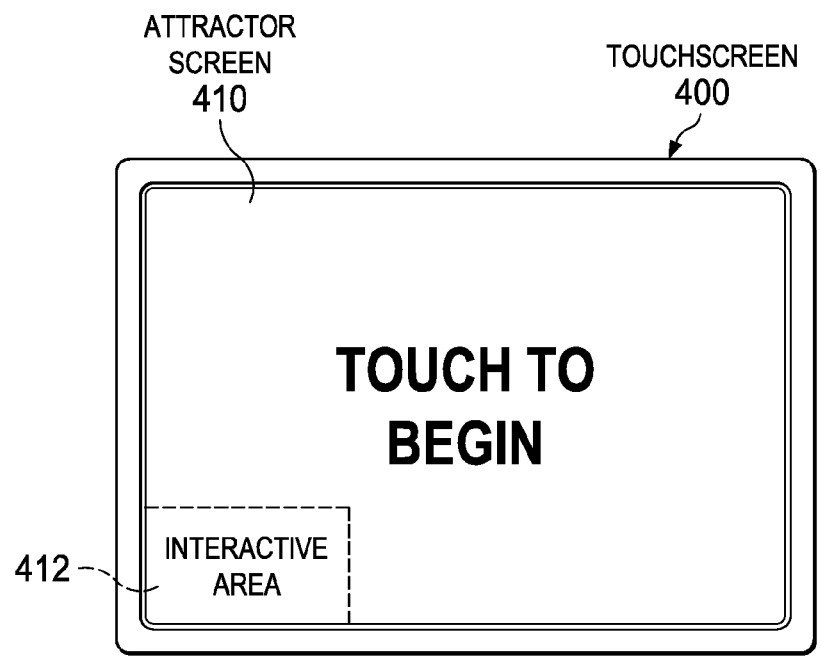
FIG. 4 is a touchscreen implementing an attractor screen according to an illustrative embodiment.

Referring now to FIG. 4, a touchscreen implementing an attractor screen is shown according to an illustrative embodiment. Touchscreen 400 can be a touchscreen such as touchscreen 320 of FIG. 3.

Attractor screen 410 is an image, graphic, text or other indicia designed to elicit interest in the data processing system. Attractor screen 410 prompts a user to interact with touchscreen 400. User interaction with touchscreen 400 will launch an application software, such as control software 310 of FIG. 3.

Attractor screen 410 is provided with interactive area 412. Interactive area 412 is a designated portion of touchscreen 400, the interaction will launch the application software utilizing a software overlay, such as software overlay 340 of FIG. 3. In an illustrative embodiment, interactive area 412 is visually indistinguishable from other areas of attractor screen 410. A user is only alerted to the existence of interactive area 412 by listening to audio instructions provided by an audio output, such as audio output 330 of FIG. 3. The audio instructions may, for example, describe the relative location of interactive area 412 within attractor screen 410. Furthermore, the audio instructions may require the user to interact with interactive area 412 using a certain haptic pattern, such as depressing the interactive area 412 for a predetermined time period.

If the data processing system determines that an interaction with touchscreen 400 has not occurred using interactive area 412 and the certain haptic pattern, the data processing system will launch control software without the software overlay. However, if the data processing system determines that an interaction with the interactive area 412 has occurred using the certain haptic pattern, the data processing system will launch control software and the software overlay.

Figure 5:
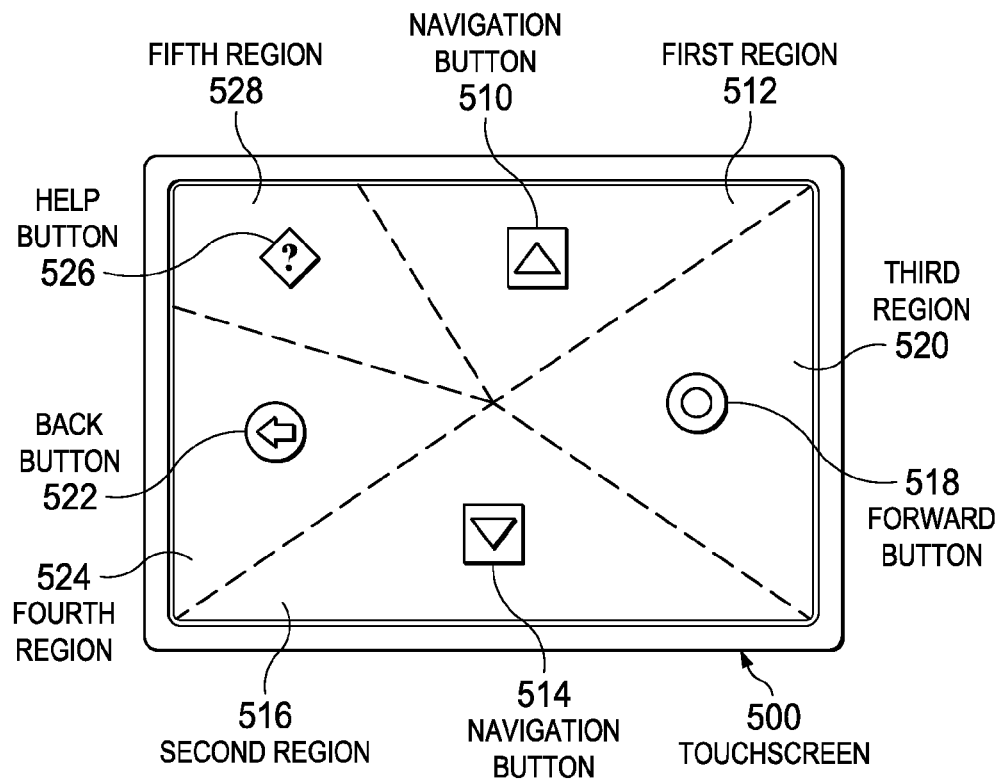
FIG. 5 is a touchscreen implementing an exemplary software overlay according to an illustrative embodiment.

Referring now to FIG. 5, a touchscreen implementing an exemplary software overlay is shown according to an illustrative embodiment. Touchscreen 500 can be a touchscreen, such as touchscreen 320 of FIG. 3.

Touchscreen 500 is partitioned into five regions, with a single navigational interaction located in each of the separate partitions. Navigation button 510 is located in first region 512. Navigation button 510 provides users with a method to navigate upwards through the audio-announced menu choices. To navigate upward through the menu choices, a user interacts with first region 512 of touchscreen 500. A software overlay, such as software overlay 340 of FIG. 3, will register any interaction within first region 512 as an interaction with navigational button 510. When navigating through a current menu of the control software, the user can interact with first region 512 in order to preselect or highlight a preceding menu choice.

Navigation button 514 is located in second region 516. Navigation button 514 provides users with a method to navigate downward through the audio-announced menu choices. To navigate downward through the menu choices, a user interacts with second region 516 of touchscreen 500. A software overlay, such as software overlay 340 of FIG. 3, will register any interaction within second region 516 as an interaction with navigational button 514. When navigating through a current menu of the control software, the user can interact with second region 516 in order to preselect or highlight a subsequent menu choice.

Forward button 518 is located in third region 520. Forward button 518 provides users with a method to select a current audio-announced menu choice. To select a current menu choice, a user interacts with third region 520 of touchscreen 500. A software overlay, such as software overlay 340 of FIG. 3, will register any interaction within third region 520 as an interaction with forward button 518. When selecting a current option announced from a menu of the control software, the user can interact with third region 520 in order to select the current menu choice.

Back button 522 is located in fourth region 524. Back button 522 provides users with a method to select to navigate to a previous screen, menu, or list. To navigate to a previous screen, a user interacts with fourth region 524 of back button 522. A software overlay, such as software overlay 340 of FIG. 3, will register any interaction within fourth region 524 as an interaction with back button 522. When navigating back to a previously announced menu of the control software, the user can interact with fourth region 524.

Help button 526 is located in fifth region 528. Help button 526 provides users with a method to gain help for any key, button, on screen element, or other aspect of the data processing system. To get help with a particular menu choice, a user interacts with fifth region 528 of touchscreen 500 after preselecting the particular menu choice using one of forward button 518 or back button 522. A software overlay, such as software overlay 340 of FIG. 3, will register any interaction within fifth region 528 as an interaction with help button 526. When a current option is preselected and announced from a menu of the control software, the user can interact with fifth region 528 in order to gain help or additional information on the current selection.

Figure 6:
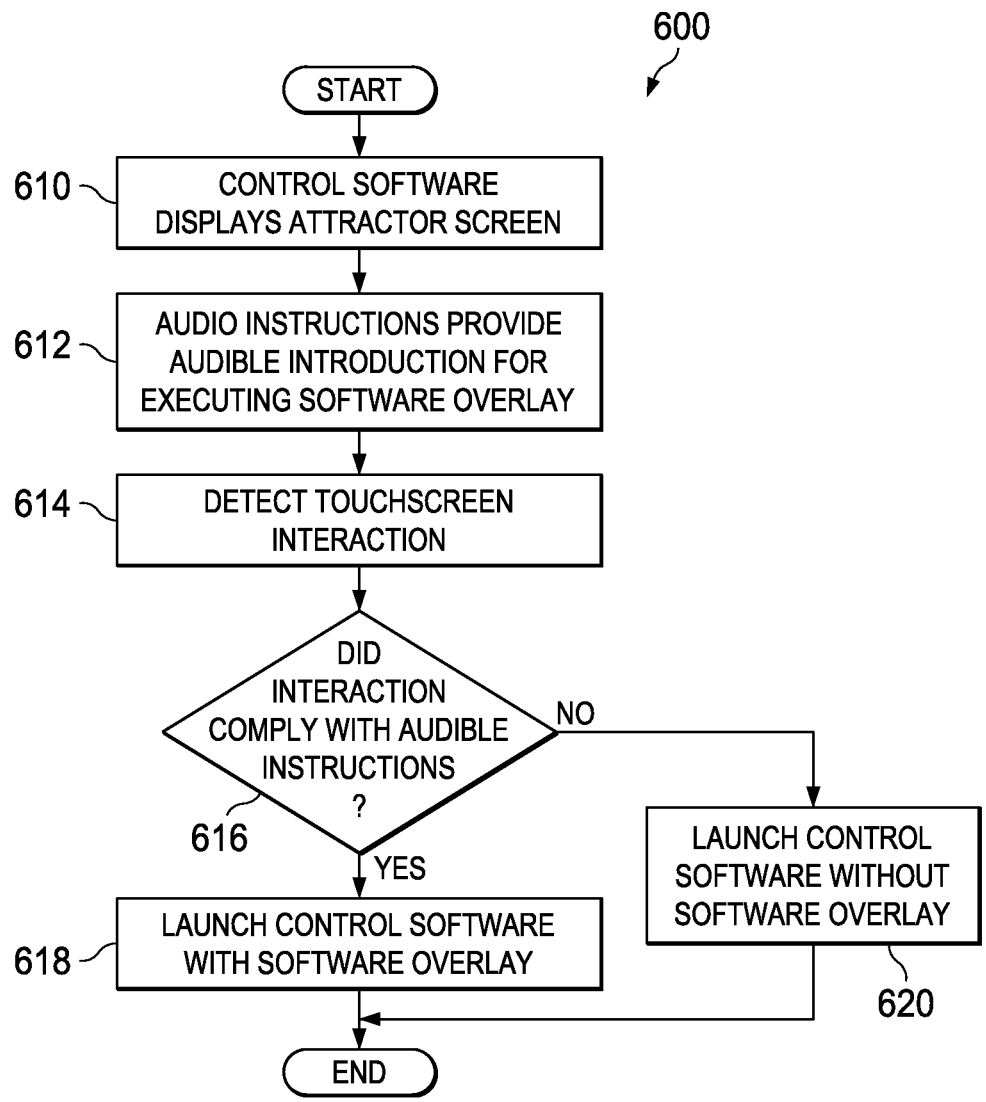
FIG. 6 is a flowchart of a software process for enabling accommodations to access public use software environments according to an illustrative embodiment.

Referring now to FIG. 6, a flowchart of a software process for enabling accommodations to access public use software environments is shown according to an illustrative embodiment. Process 600 is a software process, executing on a software component, such as control software 310 of FIG. 3.

Process 600 begins by displaying an attractor screen (step 610). The attractor screen can be attractor screen 410 of FIG. 4. The attractor screen is an image, graphic, text or other indicia designed to elicit interest in the data processing system on which process 600 is running.

Process 600 simultaneously provides audio instructions for executing a software overlay (step 612). A user is only alerted to the existence of an interactive area, such as interactive area 412 of FIG. 4, by listening to audio instructions provided by an audio output, such as audio output 330 of FIG. 3. The audio instructions may, for example, describe the relative location of the interactive area within the attractor screen. Furthermore, the audio instructions may require the user to interact with the interactive area using a certain haptic pattern, such as depressing the interactive area for a predetermined time period.

Process 600 detects an interaction with the touchscreen (step 614). While the touchscreen typically will detect interaction with the touchscreen by a finger or hand, the touchscreen can also be configured to sense other objects, such as, but not limited to, a stylus. The touchscreen enables a user to directly interact with images displayed on the touchscreen, and therefore the underlying application software, rather than indirectly with a mouse or touchpad.

Responsive to detecting the interaction with the touchscreen, process 600 determines whether the interaction complies with the audio instructions (step 616). In one illustrative embodiment, process 600 determines whether the interaction is within the interactive area of the attractor screen as described by the audio instructions. In one illustrative embodiment, process 600 determines whether the interaction with the attractor screen complies with a certain haptic pattern described by the audio instructions.

If the interaction complies with the audible instructions ("yes" at step 616), process 600 will launch control software and the software overlay (step 618). The data processing system determines that an interaction with the interactive area has occurred using the certain haptic pattern, as described by the audio instructions. The software overlay provides an intuitive graphical user interface, separate from the interface provided by application software. The intuitive graphical user interface of the software overlay renders the underlying application software more intuitive and user friendly to persons having a visual impairment. Additionally, software overlay 340 of FIG. 3 provides audio instructions detailing menu options and current navigational status of the underlying application software. The process terminates thereafter.

Returning now to step 616, if the interaction does not comply with the audible instructions ("no" at step 616), process 600 will launch control software without the software overlay (step 620). The data processing system determines that the interaction with the touchscreen did not utilize either or both of the interactive areas and certain haptic pattern. Therefore, the data processing system identifies the interaction as a normal interaction, and launches the application software without the software overlay. The user interface displayed to the user is that of the application software, and not of the software overlay. The process terminates thereafter.

Referring now to FIG. 7, a flowchart of a software process for providing accommodations to access public use software environments is shown according to an illustrative embodiment. Process 700 is a software process, executing on a software component, such as software overlay 340 of FIG. 3.

Responsive to launching control software with the software overlay, process 700 plays audio instructions describing how to use the touchscreen, as well as any introductory text that exists on the screen for all users (step 710). Process 700 then receives a touchscreen interaction from the user (step 712).

Process 700 can detect a touchscreen interaction with a first region (step 714), such as first region 512 of FIG. 5. A navigation button, such as navigation button 510 of FIG. 5 is located in the first region. The navigation button provides users with a method to navigate upwards through the audio-announced menu choices. A software overlay, such as software overlay 340 of FIG. 3, will register any interaction within the first region as an interaction with the navigation button. When navigating through a current menu of the control software, the user can interact with the first region in order to preselect or highlight a preceding or subsequent menu choice.

Responsive to detecting an interaction with the first region, process 700 plays the preceding menu choice (step 716). The played audio corresponds to the text or menu selection located spatially above a menu choice that was previously preselected. Responsive to playing the preceding menu choice, process 700 iterates back to step 712 to receive additional touchscreen interactions.

Process 700 can detect a touchscreen interaction with a second region (step 718), such second region 516 of FIG. 5. A navigation button, such as navigation button 514 of FIG. 5 is located in the second region. The navigation button provides users with a method to navigate downward through the audio-announced menu choices. A software overlay, such as software overlay 340 of FIG. 3, will register any interaction within the second region as an interaction with the navigation button. When navigating through a current menu of the control software, the user can interact with the second region in order to preselect or highlight a preceding or subsequent menu choice.

Responsive to detecting an interaction with the second region, process 700 plays the subsequent menu choice (step 720). The played audio corresponds to the text or menu selection located spatially below a menu choice that was previously preselected. Responsive to playing the subsequent menu choice, process 700 iterates back to step 712 to receive additional touchscreen interactions.

Process 700 can detect a touchscreen interaction with a third region (step 722), such third region 520 of FIG. 5. A forward button, such as forward button 518 of FIG. 5 is located in the third region. The forward button provides users with a method to select a current audio-announced menu choice. A software overlay, such as software overlay 340 of FIG. 3, will register any interaction within the third region as an interaction with the forward button. When navigating through a current menu of the control software, the user can interact with the third region in order to select the current menu choice.

Responsive to detecting an interaction with the third region, process 700 selects the current menu choice, and performs actions associated therewith (step 724). Responsive to selecting the current menu choice and performing actions associated therewith, process 700 iterates back to step 712 to receive additional touchscreen interactions.

Process 700 can detect a touchscreen interaction with a fourth region (step 726), such fourth region 524 of FIG. 5. A back button, such as back button 522 of FIG. 5 is located in the fourth region. The back button provides users with a method to select to navigate to a previous screen, menu, or list. A software overlay, such as software overlay 340 of FIG. 3, will register any interaction within the fourth region as an interaction with the back button. When navigating through a current menu of the control software, the user can interact with the fourth region in order to navigate to a previous screen, menu, or list.

Responsive to detecting an intereaction with the fourth region, process 700 navigates to a previous screen, menu, or list (step 728). This function calls the "back" button on the underlying application software, or, if no "back" button exists within the application software, process 700 navigates to the first previously presented screen, menu, or list. Responsive to navigating to a previous screen, menu, or list, process 700 iterates back to step 712 to receive additional touchscreen interactions.

Process 700 can detect a touchscreen interaction with a fifth region (step 730), such fifth region 528 of FIG. 5. A help button, such as help button 526 of FIG. 5 is located in the fifth region. The help button provides users with a method gain help for any key, button, on screen element, or other aspect of the data processing system. A software overlay, such as software overlay 340 of FIG. 3, will register any interaction within the fifth region as an interaction with the help button. When navigating through a current menu of the control software, the user can interact with the fifth region in order to gain help or additional information on the current pre-selection.

Responsive to providing help for any key, button, on screen element, or other aspect of the data processing system, process 700 plays the preceding or subsequent menu choice (step 732). The played audio corresponds to help information for any preselected key, button, on screen element.

Process 700 can detect a restart touchscreen interaction (step 734). A restart interaction is an interaction with the touchscreen that prompts the system to restart the application software at a first page, a beginning navigation page, or the attractor page. The restart interaction can be, for example, but not limited to, detecting the user pressing the help button, or the fifth region, for an extended, predetermined period of time. Responsive to detect a restart touchscreen interaction, process 700 can require a user confirmation that they want to exit the current navigation or software overlay (step 736). Responsive to receiving confirmation, process 700 exits the current navigational session (step 738), with the process terminating thereafter.

The illustrative embodiments provide a computer implemented method for accommodating access to public use software environments. An attractor screen is displayed on the public use environment. An interaction with the attractor screen is then detected. If the interaction with the attractor screen complies with audio instructions for executing a software overlay, the control software for the public use system is launched along with the software overlay. If the interaction with the attractor screen does not comply with audio instructions for executing a software overlay, the control software for the public use system is launched without the software overlay.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for providing access to a data processing system, the method comprising the computer implemented steps of:
   displaying an attractor screen on a touchscreen in the data processing system, wherein a user accesses first audio instructions by connecting a sound device to a connection input, the first audio instructions being provided only through the sound device, the first audio instructions describing a haptic pattern input required to launch a software overlay;
   detecting a first interaction with the touchscreen;
   determining whether the first interaction complies with first audio instructions for executing the software overlay, wherein the software overlay provides an intuitive graphical user interface separate from an interface provided by control software, wherein the intuitive graphical user interface rearranges elements of the interface provided by the control software and provides audio instructions detailing menu options and current navigational status;
   responsive to determining that the first interaction complies with the audio instructions for executing the software overlay, launching control software and the software overlay;
   responsive to determining that the interaction does not comply with the first audio instructions, launching the control software but not launching the software overlay;
   responsive to launching the software overlay, playing second audio instructions through the sound device describing how to use the touchscreen, and describing a layout of a plurality of regions on the touchscreen provided by the software overlay; and
   detecting a second interaction with the touchscreen.

2. The computer implemented method of claim 1 further comprising:
   responsive to the second interaction being an interaction with a first region of the plurality of regions on the touchscreen, registering the second interaction as an interaction with a first navigation button, wherein interaction with the first navigation button preselects or highlights a preceding menu choice; and
   responsive to registering the second interaction as the interaction with the first navigation button, audibly playing the preceding menu choice through the sound device.

3. The computer implemented method of claim 1 further comprising:
   responsive to the second interaction being an interaction with a second region of the plurality of regions on the touchscreen, registering the second interaction as an interaction with a second navigation button, wherein interaction with the second navigation button preselects or highlights a subsequent menu choice; and
   responsive to registering the second interaction as the interaction with the second navigation button, audibly playing the subsequent menu choice through the sound device.

4. The computer implemented method of claim 1 further comprising:
   responsive to the second interaction being an interaction with a third region of the plurality of regions on the touchscreen, registering the second interaction as an interaction with a forward button, wherein interaction with the forward button selects a current menu choice;
   responsive to registering the second interaction as the interaction with the forward button, selecting the current menu choice, and performing actions associated with the current menu choice; and
   audibly playing the actions associated with the current menu choice through the sound device.

5. The computer implemented method of claim 1 further comprising:
   responsive to the second interaction being an interaction with a fourth region of the plurality of regions on the touchscreen, registering the second interaction as an interaction with a back button, wherein interaction with the back button navigates to a previous screen, a previous menu, or a previous list; and
   responsive to registering the second interaction as the interaction with the back button, navigating to the previous screen, the previous menu, or the previous list; and
   audibly playing the previous screen, the previous menu, or the previous list through the sound device.

6. The computer implemented method of claim 1 further comprising:
   responsive to the second interaction being an interaction with a fifth region of the plurality of regions on the touchscreen, registering the second interaction as an interaction with a help button, wherein interaction with the help button provides help or additional information on a currently pre-selected menu item;
   responsive to registering the second interaction as an interaction with a help button, providing help for the currently pre-selected menu item;
   audibly playing the help for the currently pre-selected menu item through the sound device.

7. The computer implemented method of claim 1, wherein the plurality of regions on the touchscreen comprises five partitions, wherein a single navigational interaction is located in each of the separate partitions; wherein the five partitions further comprise:
   a first region, the first region including a first navigation button, and wherein the first region is spatially located toward a top of the touchscreen;
   a second region, the second region including a second navigation button, and wherein the second region is spatially located toward a bottom of the touchscreen;

a third region, the third region including a forward navigation button, and wherein the third region is spatially located toward a right side of the touchscreen;

a fourth region, the fourth region including a back navigation button, and wherein the fourth region is spatially located toward a left side of the touchscreen; and a fifth region, the fifth region including a help navigation button, and wherein the fifth region is spatially located toward an upper left corner of the touchscreen.

8. The computer implemented method of claim 7, wherein the software overlay is a script written in an object oriented programming language that enables the software overlay to access objects within the control software.

9. A non-transitory computer storage medium having computer usable program code encoded thereon for providing access to a data processing system, the computer usable program code comprising:

instructions for displaying an attractor screen on a touchscreen;

instructions for providing first audio instructions to a connection input, wherein a user accesses first audio instructions by connecting a sound device to the connection input, the first audio instructions being provided only through the sound device, the first audio instructions describing a haptic pattern input required to launch a software overlay;

instructions for detecting a first interaction with the touchscreen;

instructions for determining whether the first interaction complies with first audio instructions for executing software overlay, wherein the software overlay provides an intuitive graphical user interface separate from an interface provided by control software, wherein the intuitive graphical user interface rearranges elements of the interface provided by the control software and provides audio instructions detailing menu options and current navigational status;

instructions, responsive to determining that the first interaction complies with the audio instructions for executing the software overlay, for launching control software and the software overlay;

instructions, responsive to determining that the interaction does not comply with the first audio instructions, for launching the control software but not launching the software overlay;

instructions, responsive to launching the software overlay, for playing second audio instructions through the sound device describing how to use the touchscreen, and describing a layout of a plurality of regions on the touchscreen provided by the software overlay; and instructions for detecting a second interaction with the touchscreen.

10. The non-transitory computer storage medium of claim 9, wherein the computer usable program code further comprises:

instructions, responsive to the second interaction being an interaction with a first region of the plurality of regions on the touchscreen, for registering the second interaction as an interaction with a first navigation button, wherein interaction with the first navigation button preselects or highlights a preceding menu choice; and instructions, responsive to registering the second interaction as the interaction with the first navigation button, for audibly playing the preceding menu choice through the sound device.

11. The non-transitory computer storage medium of claim 9, wherein the computer usable program code further comprises:

instructions, responsive to the second interaction being an interaction with a second region of the plurality of regions on the touchscreen, for registering the second interaction as an interaction with a second navigation button, wherein interaction with the second navigation button preselects or highlights a subsequent menu choice; and instructions, responsive to registering the second interaction as the interaction with the second navigation button, for audibly playing the subsequent menu choice through the sound device.

12. The non-transitory computer storage medium of claim 9, wherein the computer usable program code further comprises:

instructions, responsive to the second interaction being an interaction with a third region of the plurality of regions on the touchscreen, for registering the second interaction as an interaction with a forward button, wherein interaction with the forward button selects a current menu choice;

instructions, responsive to registering the second interaction as the interaction with the forward button, for selecting the current menu choice and for performing actions associated with the current menu choice; and instructions for audibly playing the actions associated with the current menu choice through the sound device.

13. The non-transitory computer storage medium of claim 9, wherein the computer usable program code further comprises:

instructions, responsive to the second interaction being an interaction with a fourth region of the plurality of regions on the touchscreen, for registering the second interaction as an interaction with a back button, wherein interaction with the back button navigates to a previous screen, a previous menu, or a previous list; and instructions, responsive to registering the second interaction as the interaction with the back button, for navigating to the previous screen, the previous menu, or the previous list; and instructions for audibly playing the previous screen, the previous menu, or the previous list through the sound device.

14. The non-transitory computer storage medium of claim 9, wherein the computer usable program code further comprises:

instructions, responsive to the second interaction being an interaction with a fifth region of the plurality of regions on the touchscreen, for registering the second interaction as an interaction with a help button, wherein interaction with the help button provides help or additional information on a currently pre-selected menu item instructions, responsive to registering the second interaction as an interaction with the help button, for providing help for the currently pre-selected menu item;

instructions for audibly playing the help for the currently pre-selected menu item through the sound device.

15. The non-transitory computer storage medium of claim 9, wherein the plurality of regions on the touchscreen comprises five partitions, wherein a single navigational interaction is located in each of the separate partitions; wherein the five partitions further comprise:

a first region, the first region including a first navigation button, and wherein the first region is spatially located toward a top of the touchscreen;

a second region, the second region including a second navigation button, and wherein the second region is spatially located toward a bottom of the touchscreen;

a third region, the third region including a forward navigation button, and wherein the third region is spatially located toward a right side of the touchscreen;

a fourth region, the fourth region including a back navigation button, and wherein the fourth region is spatially located toward a left side of the touchscreen; and a fifth region, the fifth region including a help navigation button, and wherein the fifth region is spatially located toward an upper left corner of the touchscreen.

16. A data processing system comprising:
a storage having computer usable program code encoded thereon for providing access to a data processing system;
a bus system; and
a processor, wherein the processor executes the computer usable program code: to display an attractor screen on a touchscreen, wherein a user accesses first audio instructions by connecting a sound device to a connection input, the first audio instructions being provided only through the sound device, the first audio instructions describing a haptic pattern input required to launch a software overlay; to detect a first interaction with the touchscreen; to determine whether the first interaction complies with first audio instructions for executing the software overlay, wherein the software overlay provides an intuitive graphical user interface separate from an interface provided by control software, wherein the intuitive graphical user interface rearranges elements of the interface provided by the control software and provides audio instructions detailing menu options and current navigational status; responsive to determining that the first interaction complies with the audio instructions for executing the software overlay, to launch control software and the software overlay; responsive to determining that the first interaction does not comply with the audio instructions for executing the software overlay, to launch the control software but not to launch the software overlay; responsive to launching the software overlay, to play second audio instructions through the sound device describing how to use the touchscreen, and describing a layout of a plurality of regions on the touchscreen provided by the software overlay; to detect a second interaction with the touchscreen.

17. The data processing system of claim 16, wherein the processor further executes the computer usable program code:
responsive to the second interaction being an interaction with a first region of the plurality of regions on the touchscreen, to register the second interaction as an interaction with a first navigation button, wherein interaction with the first navigation button preselects or highlights a preceding menu choice; and
responsive to registering the second interaction as the interaction with the first navigation button, to audibly play the preceding menu choice through the sound device.

18. The data processing system of claim 16, wherein the processor further executes the computer usable program code:
responsive to the second interaction being an interaction with a second region of the plurality of regions on the touchscreen, to register the second interaction as an interaction with a second navigation button, wherein interaction with the second navigation button preselects or highlights a subsequent menu choice; and responsive to registering the second interaction as the interaction with the second navigation button, to audibly play the subsequent menu choice through the sound device.

19. The data processing system of claim 16, wherein the processor further executes the computer usable program code:
responsive to the second interaction being an interaction with a third region of the plurality of regions on the touchscreen, to register the second interaction as an interaction with a forward button, wherein interaction with the forward button selects a current menu choice; responsive to registering the second interaction as the interaction with the forward button, to select the current menu choice, and to perform actions associated with the current menu choice; and to audibly play the actions associated with the current menu choice through the sound device.

20. The data processing system of claim 16, wherein the processor further executes the computer usable program code:
responsive to the second interaction being an interaction with a fourth region of the plurality of regions on the touchscreen, to register the second interaction as an interaction with a back button, wherein interaction with the back button navigates to a previous screen, a previous menu, or a previous list; responsive to registering the second interaction as the interaction with the back button, to navigate to the previous screen, the previous menu, or the previous list; and to audibly play the previous screen, the previous menu, or the previous list through the sound device.

21. The data processing system of claim 16, wherein the processor further executes the computer usable program code:
responsive to the second interaction being an interaction with a fifth region of the plurality of regions on the touchscreen, to register the second interaction as an interaction with a help button, wherein interaction with the help button provides help or additional information on a currently pre-selected menu item; responsive to registering the second interaction as an interaction with a help button, to provide help for the currently pre-selected menu item; and to audibly play the help for the currently pre-selected menu item through the sound device.

22. The computer implemented method of claim 1, wherein the sound device is a headset.

23. The tangible computer storage medium of claim 9, wherein the sound device is a headset.

* * * * *